US008088317B1

United States Patent
Karem

(10) Patent No.: US 8,088,317 B1
(45) Date of Patent: *Jan. 3, 2012

(54) PARTIALLY AUTOMATED FABRICATION OF COMPOSITE PARTS

(76) Inventor: Abe Karem, Tustin, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/948,620

(22) Filed: Nov. 17, 2010

Related U.S. Application Data

(63) Continuation-in-part of application No. 12/396,927, filed on Mar. 3, 2009, now Pat. No. 7,858,012.

(60) Provisional application No. 61/033,319, filed on Mar. 3, 2008.

(51) Int. Cl.
*B29C 33/00* (2006.01)
(52) U.S. Cl. ............... 264/227; 264/226; 264/219
(58) Field of Classification Search ............ 264/226, 264/227, 219
See application file for complete search history.

(56) References Cited

U.S. PATENT DOCUMENTS

| | | | |
|---|---|---|---|
| 2,915,789 A | 12/1959 | Dykstra et al. | |
| 3,202,560 A | 8/1965 | Michael | |
| 3,574,040 A | 4/1971 | Chitwood et al. | |
| 4,167,430 A | 9/1979 | Arachi | |
| 4,518,288 A | 5/1985 | Cilindro | |
| 4,780,262 A | 10/1988 | Von Volkli | |
| 4,815,383 A | 3/1989 | Ward et al. | |
| 4,822,436 A | 4/1989 | Callis et al. | |
| 4,859,528 A * | 8/1989 | Lee et al. | 442/180 |
| 4,863,663 A | 9/1989 | Nico, Jr. et al. | |
| 5,152,856 A | 10/1992 | Thein et al. | |
| 5,292,475 A | 3/1994 | Mead et al. | |
| 5,368,807 A | 11/1994 | Lindsay | |
| 6,012,883 A | 1/2000 | Engwall et al. | |
| 6,186,707 B1 | 2/2001 | Kain | |
| 6,403,195 B1 | 6/2002 | Montagna et al. | |
| 2003/0146346 A1 | 8/2003 | Chapman | |
| 2007/0029038 A1 | 2/2007 | Brown et al. | |
| 2007/0063378 A1* | 3/2007 | O'Donoghue | 264/219 |
| 2009/0218723 A1* | 9/2009 | Karem | 264/219 |

FOREIGN PATENT DOCUMENTS

| WO | 2008/056161 A2 | 5/2008 |
|---|---|---|
| WO | WO 2008056161 A2 * | 5/2008 |

* cited by examiner

*Primary Examiner* — Christina Johnson
*Assistant Examiner* — Galen Hauth
(74) *Attorney, Agent, or Firm* — Fish & Associates, PC

(57) ABSTRACT

A high quality finished prototype aircraft or other composite part is manufactured using a low temperature limit male mold, a cured female tool, and an at least partially automated layup process, and then touched up by hand to meet a tolerance or other specification. The female tool is preferably made from a male mold, by depositing layers of composite material over the mold, curing the tool together at a first cure temperature, separating the tool and mold, and then curing the tool at a second, higher temperature. The first cure temperature should be at or below an upper limit temperature no greater than 180° F. The second cure temperature is preferably in the range of 250° F. to 350° F. The step of hand touching up can comprise one or more of mechanically abrading and deforming a first portion of the composite part to mate with a second portion of a composite part.

12 Claims, 7 Drawing Sheets

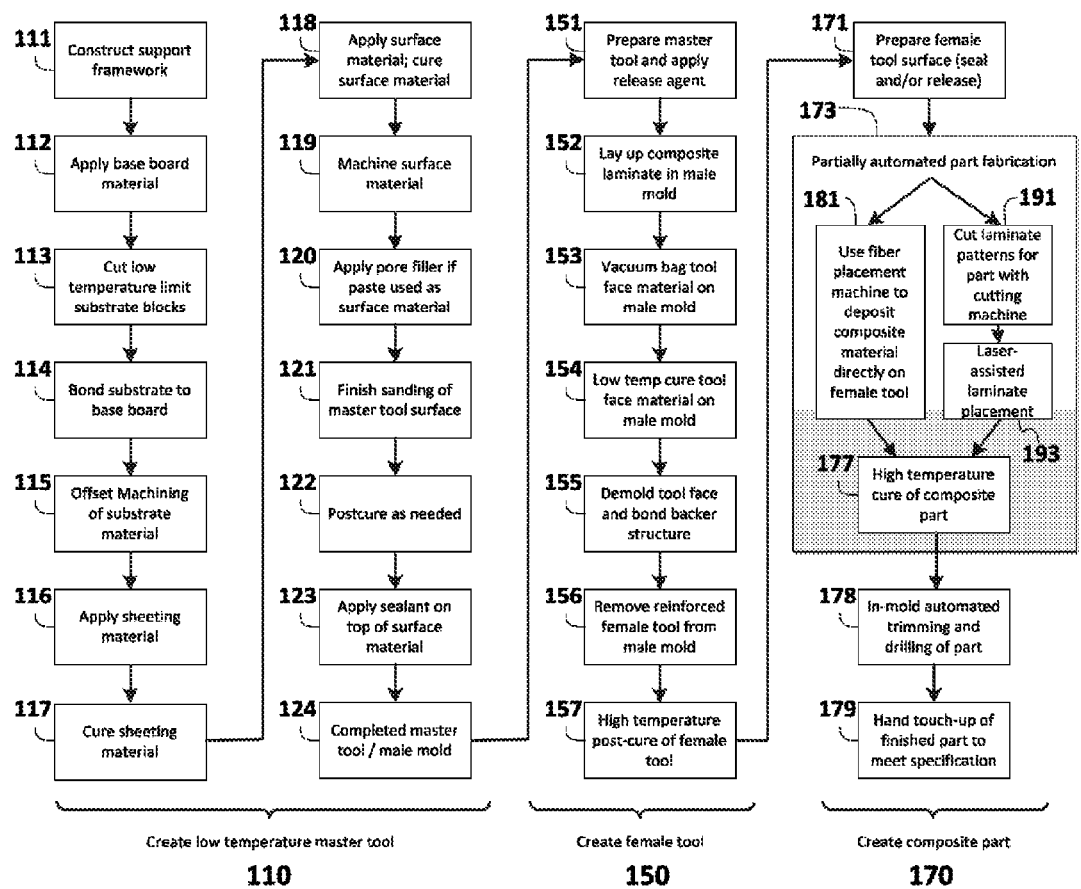

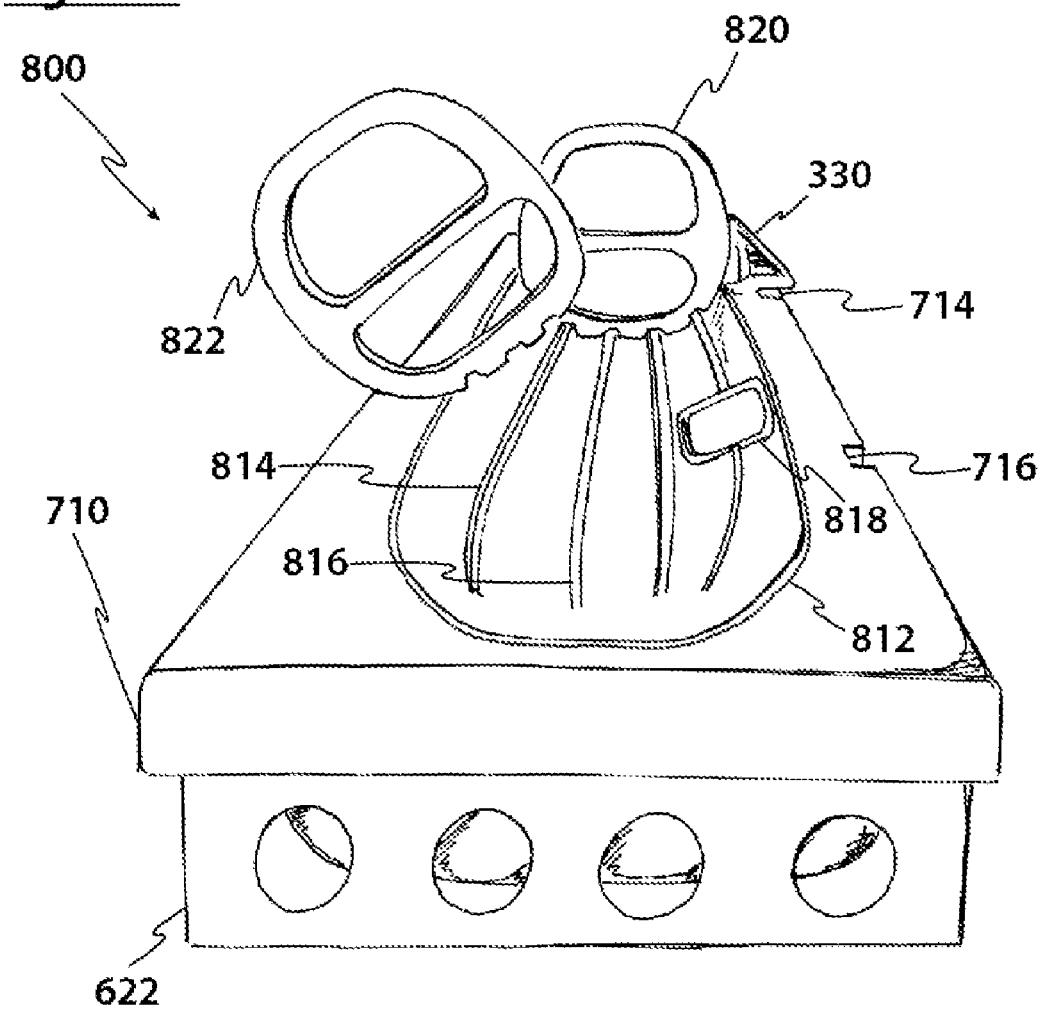

PARTIALLY AUTOMATED FABRICATION OF COMPOSITE PARTS

This application is a continuation in part of U.S. application Ser. No. 12/396,927 filed Mar. 3, 2009 and further claims priority to U.S. Provisional Application Ser. No. 61/033,319 filed Mar. 3, 2008. These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is fabrication of composite parts.

BACKGROUND

The advantages of using composites comprising carbon fiber reinforced epoxy or other thermosetting or thermoplastic resins in advanced structures, especially for aircraft, are well known in the industry. In recent years, carbon composite materials have begun to find wide acceptance in aircraft structures. With these new materials have come new manufacturing, maintenance and life cycle management processes, combined with new machines and analysis methods to manufacture and understand these materials.

The manufacture of composite structures in production quantities has been accomplished, at least in part, through the migration towards automated manufacturing methods. Automated tape laying and fiber placement machines make high quality production parts for the Boeing™ 787 transport aircraft. Further, the use of such automated machines along with high quality steel tooling as practiced in the prior art results in high dimensional tolerance and eliminates the need for hand touch-up of the finished fuselage. Fiber placement machines are also used in the production of the fuselage of the Raytheon™ Premier. In most scenarios, this not only reduces manufacturing costs for large volumes, but also compensates for the shortage of skilled aircraft-quality composite technicians available for manual labor.

Further, autoclaves tend to be used in production programs. However, acquisition and use of autoclaves, especially large autoclaves, in production of aircraft fuselage structures is expensive.

The prior art industry norm is to build aircraft directly to production standards when the aerodynamics, propulsion system, and dynamics are of an evolutionary nature, and the market for such aircraft is sufficiently well known. In such cases the industry or military customer can justify the large investment in production tooling, production process control, and detailed analyses, while being reasonably assured that no significant changes will be required during the aircraft ground and flight testing and certification or military qualification. In cases where substantial deviation from the known aerodynamic configurations, propulsion systems, or dynamics are attempted, or the market is not secure, low cost prototypes or research aircraft are built and flight tested before committing to a production program.

In the field of composite airframes, prior art prototype construction has not followed the same methods as production aircraft construction. Composite prototype fuselage structures tend to approximate the final airframe external shape quickly and inexpensively but do not conform to the processes or quality of typical production composite fuselage structures. By contrast, prior art aluminum prototype fuselage structures are typically made using similar processes as final production aluminum fuselage structures.

More recently, the industry has used automated machines for the manufacture of wing skins of expensive military prototypes and research aircraft. Such skins are relatively flat and mostly of single curvature: shapes that lend themselves well to manufacture using tape laying machines. Such composite skins have typically been assembled with metal internal supporting structure. No known prior art prototype uses the level of automation found, for example, in the composite airframe construction of the production Boeing™ 787 aircraft.

There is an inherent conflict between the investment required to achieve high quality, accurate, repeatable, production-type parts and the lack of resources, funding, and time usually associated with prototype parts and efforts.

The substantial differences in weights, systems, and dynamics between prototype and production composite aircraft make a prototype essentially an aero-propulsion proof-of-concept. In most cases, the prototype fully conforms to the production shape, but is built with a different fuselage structure (for example that might include foam cores), whereas production aircraft would use stringers as layed up by automated machines.

Prototyping methods for composite fuselage structures have evolved to be completely different from production methods for very good reasons. First, prototyping tends to build a fuselage with manual labor, thereby reducing capital costs. Smaller pieces are favored due to limited reach of technicians, and the out-of-refrigeration time limit of many materials. Production methods on the other hand, tend to favor larger pieces, or even unitary construction, which can be cost-effectively built using automated composite lay-up machines. Second, prototyping has greater dimensional inaccuracy and large part-to-part variations, which is considered unacceptable when building production quantities, among other things because the parts are not sufficiently interchangeable. Automated machines have high dimensional accuracy, and produce interchangeable parts that require no fitting (or other hand touch up) during assembly. But the automated machines come at a high up front or capital cost that is not justified for many protoyping jobs.

In short, it is appreciated in the prior art that the use of labor in prototyping trades off against the higher cost of tooling and machinery in production, and that it makes little sense to have both high costs of labor and high costs of equipment. What is unappreciated in the prior art is that there are instances in which it may be cost-effective to make tooling with protoyping methods, but manufacturing the final fuselage structure using automated composite layup machines.

Therefore, there is a need for a schedule- and cost-affordable composite prototyping process which provides production quality or production conforming airframes.

SUMMARY OF THE INVENTION

The inventive subject matter provides apparatus, systems and methods in which a high quality finished prototype aircraft or other composite part is manufactured using a cured female tool and an at least partially automated fabrication method. The cured female tool is advantageously fabricated with a low temperature limit master tool.

Male molds can be made of any suitable material, including for example, polyurethane foam, epoxy foam, polystyrene foam, or epoxy board. Preferred male molds will warp or otherwise permanently deform at or above an upper limit temperature of 120, 140, 160, or 180 degrees Fahrenheit.

The female tool is preferably made from a master tool, by depositing layers of composite material over the master tool, curing the female tool and master tool together at a primary cure temperature, separating the female tool and female tool face from the master tool, and then curing the female tool at a secondary, higher cure temperature. The female tool can comprise any suitable material, including for example, at least one of carbon-epoxy and fiberglass-epoxy. The female tool can be used in other ways, for example, as a fixture for in-mold trimming and/or drilling and/or for mating the part with other parts or assemblies.

The primary cure temperature should be at or below an upper limit temperature of the mold, which with currently preferred materials is likely to be no greater than 180° F. The secondary cure temperature, corresponding to the high temperature cure cycle, is at least 20° F. above the upper limit temperature and preferably in the range of 250° F. to 350° F. or between 240° F. and 400° F.

In other preferred aspects, a step of hand touching up can be performed on the composite part, using one or more of mechanically abrading and deforming a first portion of a composite part to mate with a second part or assembly. Moreover, where additional (subsequent) composite parts are made using the female tool, the step of hand touching up can be substantially repeated on the additional structures. This would not be done with prior art production methods, because in those instances the tool would be modified to correct any recognized defect, rather than touching up the final products.

Various objects, features, aspects and advantages of the inventive subject matter will become more apparent from the following detailed description of preferred embodiments, along with the accompanying drawing figures in which like numerals represent like components.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

BRIEF DESCRIPTION OF THE DRAWING

FIG. 1 is a flowchart depicting sequential steps in a preferred process according to the present inventive subject matter.

FIG. 8 is a perspective illustration of a further step in the same preferred manufacturing process of FIGS. 6 and 7 in which an airframe is assembled in the female tool.

DETAILED DESCRIPTION

Figure 2A:
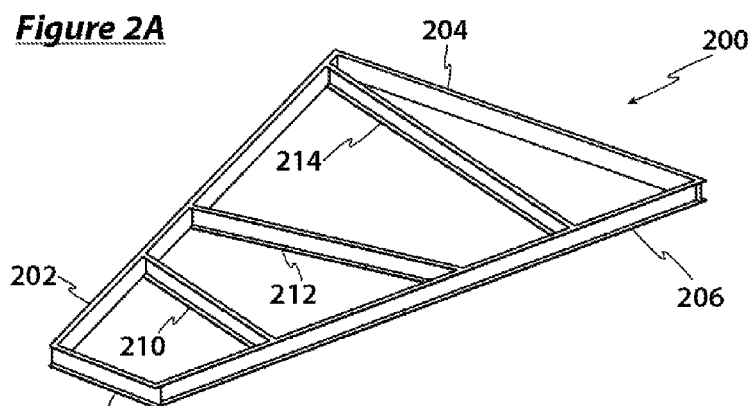
FIG. 2A is a perspective illustration of a preferred tooling support framework.

In the embodiments described below, a specialized reduced-cost low temp/high temp tooling process is combined with automated fiber placement or laser-assisted manual composite laminate layup and then hand touch-up is applied to produce production-conforming but rapid and low-cost airframe prototypes or prototype parts.

An exemplary preferred method begins with a computer-aided design (CAD) model of an aircraft airframe, component, assembly, sub-assembly, or part including its outer mold line (OML). Other, non-aircraft parts are also contemplated.

Through the use of a process workflow direct from design and CAD to computer aided manufacturing (CAM), the precision computer-numerically controlled (CNC) master tools of the composite laminating tools are to be designed and manufactured using low temperature limit plastic materials. Accuracy of the tool can be achieved by applying and machining a higher cost, higher density surface material, used in relatively small quantities.

Subsequently, high temperature limit laminating and assembly tools can be manufactured from the master tools using carbon epoxy materials and special low temp/high temp resins and tooling processes.

It is envisioned that such resins allow the material to be pre-cured at a low temperature, while on the low cost master tool, and then later be post cured, without requisite further support, at a high temperature suitable for use with the final product. It is contemplated that use of such crossover resin systems dramatically reduces the cost of the master tool, allowing it to be built with a lower cost, low temperature capability substrate material.

Finished aircraft or other parts or components can then be completed using the laminating and assembly tools and at least partially automated fabrication processes. It is contemplated that the various steps in preferred processes may be performed by one or more different vendors or entities.

There are several potential advantages to following the teachings herein:

First, it is envisioned that preferred methods result in a substantial cost reduction in both raw material cost and tool creation labor. Fiber placement processes and even laser-assisted manual layup use less material for an equivalent part as compared to traditional manual hand layup;

Second, it is contemplated that such methods would result in substantial tool weight reduction, arising partly from reduced tool thermal mass and shorter composite part curing cycle and higher manufacturing throughput;

Third, utilizing carbon-epoxy tooling eliminates coefficient of thermal expansion mismatch between the final part and the female tool, as both are preferably of carbon-epoxy construction; and Fourth, the use of both male molds and female tools provides for manufacturing of low cost assembly tools, and when production rates increase, duplicate laminating tools (rate tools in the industry vernacular).

However, these advantages are achieved at a relatively large capital cost as compared to traditional hand layup methods. Use of at least partially automated fabrication requires investment in automated equipment including, for example, an automated composite layup machine such as a fiber placement machine or tape laying machine, an automated cutting table, or a laser placement machine. In many cases, the machine will cost much more than the value of the fabrication run of prototype parts. In the prior art, use of such machines is generally considered justified only for high volume production runs. For prototype or small volume parts, it is generally preferable to use excess material (thus creating waste) and bring to bear large quantities of manual labor. Thus, a person of ordinary skill in the art would not think of combining the elements of preferred systems and methods as described herein, because it would not seem economically viable.

Many variations on the preferred systems and methods are contemplated. Preferred CAD tools include Dassault™ Catia and Dassault™ Solidworks™ among others. Preferred CAM tools include MasterCAM™ and CatiaV5 CAM, among others.

FIG. 1 is a flowchart depicting sequential steps in a preferred process according to the present inventive subject matter. In broad strokes, an aircraft part is created following three sets of steps. In a first set of steps 110, a low temperature limit master tool is fabricated. In a second set of steps 150, a high temperature limit female tool is fabricated using this master tool. In a third set of steps 170, a finished aircraft part is fabricated using the high temperature limit female tool and an at least partially automated part fabrication process.

In preferred embodiments, low temperature limit materials are used as a substrate for the master tool. Especially preferred materials include polyurethane foam from a density of 3.5 or 4 pounds per cubic foot, or even up to a density up to 6 or 8 pounds per cubic foot. Alternate preferred materials include a polystyrene foam of a density between two and four pounds per cubic foot, or epoxy board. Other materials contemplated to be suitable are those that have a density below 8 pounds per cubic foot, yield a relatively smooth surface quality when machined, and remain stable up to an upper limit temperature of 130° F.-180° F., but are unstable at temperatures more than 10 to 20° F. beyond the upper limit temperature. As used herein the terms "material" and "materials" include compositions that comprise a single chemical entity, as well as those that comprise multiple chemical entities.

As an early step 111 in preferred methods, a master tool (male mold) support framework is constructed. As used herein, the terms "male mold" and "master tool" are used interchangeably. Preferred frame structures include a steel or aluminum framework, preferably with casters for mobility, with a relatively smooth base board such as sheet steel or plywood applied on top of the frame (step 112). In step 113, a low temperature substrate (i.e., a substrate material having a low upper temperature limit) is cut in rough blocks or other shapes from manufactured blanks. In step 114, the blocks or shapes of substrate material are bonded or otherwise coupled to the frame structure using adhesive or other means. Alternate methods could perform step 113 before step 111 or 112, or omit step 113 altogether, using an entire manufactured blank of substrate material instead.

In step 115, the low temperature limit substrate mounted on a support framework is machined using a multi-axis router or a CNC machine to generate a surface offset from the desired final master mold shape and desired master tool surface. Subsequently, in step 116, the low temperature limit substrate is covered with a stiff sheeting material that acts as a shear isolation layer. Preferred coverings include a carbon-epoxy laminate applied in a wet layup, with a thickness of at least 0.020, 0.040, or even 0.060 inches. A carbon-epoxy laminate used as a sheeting material gives the tool additional stiffness useful for reacting to thermal stress and warping in the substrate of low temperature limit material. A first low temperature curing step 117 is advantageously performed to release stresses from machining Step 117 is optional depending upon the choice of surface materials. In a class of preferred processes, a carbon/epoxy layer is applied that serves as both sheeting material and a surface layer from a functional standpoint. In that class of processes, step 117 is effectively omitted, because the curing process of step 118 serves to cure both the first layers of material that function as a sheeting material, and subsequent layers of material that function as a machinable surface material. Because carbon/epoxy is generally more expensive than pastes, that class of preferred processes may entail higher material costs.

For both steps 117 and 118, the cure cycle temperature of this low temperature cure is preferably between 120° F. and 160° F., and more preferably between 130° F. and 150° F., which is near the cure temperature for the final cycle. Preferred total curing times are at least 3 hours, 5 hours, or 8 hours to allow for thorough heat soaking with slow temperature ramps (preferably between 2° F./min and 4° F./min). As described herein, curing cycle times and temperatures relate to a total time at an oven or autoclave temperature. For example, five hours at 140° F. could be achieved with 2 hours at 145° F., 1 minute at 135° F., and 3 hours at 141° F.

As used herein, a low temp mold or tool is one that loses its geometric configuration above an "upper limit temperature" of 130, 140, 160, or 180 degrees Fahrenheit. A low temp mold will thermally expand in accordance with its coefficient of thermal expansion (CTE) at temperatures lower than its upper limit temperature, but will generally maintain its geometric configuration, and not melt, burn, disintegrate or otherwise permanently deform. The use of wax or paraffin as a mold material is not considered for the present application. Also not considered are lost-wax or other processes that destroy the male mold or master tool. Thus, in preferred embodiments, the male mold or master tool is or can be re-used. A low temp mold or tool comprises some degree of low limit temperature material, contributing to the aforementioned geometric deformation. Preferred low temp molds comprise low temperature limit substrate materials including polyurethane foam, polystyrene foam, or epoxy board of type and composition such that the mold permanently deforms above an "upper limit temperature" of 120, 140, 160, or 180 degrees Fahrenheit.

Low temp tooling materials are typically classified by a curing temperature in the 130-180° F. range. Preferred sheeting materials include carbon and epoxy resin systems that are low temp tooling materials. While a few epoxy tooling boards or polyurethane foams are capable of higher limit temperatures, they show a large (more than 20%) increase in price. Regardless of temperature capability, foams and epoxies have similar coefficients of thermal expansion, $22.0 \times 10^{-6}$ in/in-° F. In contrast, high cost Invar™ tooling steel has a CTE of $0.3 \times 10^{-6}$ in/in-° F., showing much less thermal expansion, and making it more preferable for tooling where accuracy is important. Notably, this also implies that curing parts on foam or epoxy tools at temperatures above 180° F. will result in large thermal deformations in the tool. Although thermal warping can be at least partially compensated using analysis, a large thermal delta on a large master tool will create a thermal lag in the material such that a steady state temperature cannot easily be achieved before significant cross-linking occurs in the laminate and resin. This would result in a low tolerance tool. The low upper temperature limit of a substrate material is also at least partially correlated with correlated with low cost. Further, substrate materials with lower densities (less than 8.5 pounds per cubic foot) tend to be faster to machine and, relevant for large tools, result in lighter weight and more transportable master tooling.

Once the substrate and sheeting material cover has been low temperature cured, a layer of surface material is applied in step 118. An especially preferred surface material includes an epoxy contour paste having a density between 30 and 60 pounds per cubic foot, or more preferably between 40 and 50 pounds per cubic foot. Preferred epoxy contour pastes have a low temperature limit. Contour paste is advantageously applied with a paste laying machine coupled to a multi-axis router; the machine mixes ingredients or components of the paste together as they are applied in regular, numerically controlled, patterns over the surface of the tool. Alternate preferred surface materials include carbon/epoxy or fiberglass/resin laminates laid up to have a thickness of at least 0.06, 0.10, 0.15, 0.20, 0.25, or 0.30 inches before final surface machining. The surface material is cured if necessary in step 118. Whether laminates or pastes are used as a surface material, a post-curing cycle is advantageous for developing structural properties and heat stability properties, respectively. Preferred postcuring cycles would expose the male mold with surface material coating to a temperature between 120° F. and 160° F. for between 2 and 8 hours. Once the surface material has been applied, a final machining process is applied in step 119, preferably using a multi-axis router or CNC machine to achieve an overall surface tolerance of less than 0.003, 0.005, 0.007, or 0.010 inches across the entire part or component.

In preferred processes, the master tool, now with a machined surface material, is treated with a pore filler in step 120. Preferred pore fillers are used to fill imperfections in the paste cut surface, and include epoxy pore fillers. ACG™ FS233BLV is an especially preferred pore filler. If the surface material selected is carbon/epoxy, step 120 may be omitted.

In step 121, a finish sanding process is performed on the male mold surface, preferably comprising color sanding and buffing. This finish sanding process is preferably performed by hand with either portable power tools or an appropriate abrasive surface such as sandpaper or cheesecloth. In step 122, a postcuring cycle can optionally be performed, expediting the dissipation of volatile organic compounds from the chemical sealant or release. Preferred postcuring cycles the male mold to dimensionally set in its final shape. Preferred postcuring cycles would expose the male mold with surface material coating to a temperature between 120° F. and 160° F. for between 2 and 8 hours.

In step 123, a sealant is applied on top of the male mold surface to create a high quality tooling surface. All suitable sealants are contemplated, including the Chemlease™ 15, 255, 2185, and 2191 mold sealers. Once the sealant has cured and dried, step 124 yields a completed master tool. As used herein, a reference to something being placed "on top of" something else is intended to include both (a) instances when something (e.g., a material, sealing agent, or release agent) is applied on directly top of something else (e.g., a surface, a material, or a tool) and (b) instances where there is an intervening substance.

The master tool can be viewed as a male mold, from which a female tool can be produced. As used herein, the term "female tool" means a production tool that corresponds in shape to a negative of the finished product. Thus, a cavity on the corresponding female tool will mate with a protuberance on a corresponding male mold and a protuberance on the finished part. The terms "male mold" and "female tool" are used herein in a sense that does not limit shape to male and female parts. For example, each of male molds and female tools can include both convexities and concavities, and protuberances and cavities. A female tool comprises one or more faces, upon which composite material will be deposited to form a part. Thus, a female tool face influences the shape of a corresponding composite part. A female tool may also comprise additional elements, such as a backer or other structural reinforcement that do not affect the shape or geometry of a composite part.

Recent improvements in out-of-autoclave resin chemistry and rheology have produced resin systems (such as Cytec™ 5320 or ACG™ MTM-45) with viscosity versus temperature profiles that allow the resin to flow well before significant cross-linking occurs. This allows vacuum pressure alone to remove the majority of voids in the laminate to create a final product closer to autoclave cure quality.

Modern out-of-autoclave resins allow flexible curing cycles. It is contemplated that a female tool could be laminated on a male mold. A low temp cure could then be performed at a primary cure temperature (120-180 degrees Fahrenheit) with the female tool (laminate) on the tool until significant (>50%) cross linking has occurred. The laminate can then be separated from the male mold and will retain its shape when returned to an oven for a high temp post cure at a secondary cure temperature of 300-400 degrees Fahrenheit. This process readily yields laminates with good compaction (void contents between 1% and 2%) and long service life at cycle temperatures below the post cure temperature.

Preferred processes would use two-step low temp/high temp out-of-autoclave tooling resin in conjunction with a low temp epoxy male mold to create a carbon laminate female tool. Such a tool could advantageously contain reference points and features that allow it to be repositioned on an automated router or CNC machine or can be used for in-mold trimming and drilling of the final part. In this manner, it is contemplated that the laminated part need not be transferred to another tool or jig for finishing, thus reducing process steps. The carbon laminate female tool would be post cured above the cycle temperature of the envisioned laminate part, enabling continued use at the production temperature of the final part. Unlike prior art low cost prototypes, part lamination would preferably be accomplished using an automated tape laying machine or automated fiber placement machine. Use of such a machine is contemplated to increase the laminate consistency and repeatability. The automated machines could also reduce labor costs and allow for closer pre-production estimates of manufacturing times and material scrap rates.

In thermosetting resin systems, the highest cure temperature is typically an indicator of final resin glass transition temperature. Higher curing temperatures also trend toward higher degrees of resin cross-linking and thus mechanical properties. Typical high performance thermosets are cured at 350 degrees Fahrenheit.

As used herein, an out-of-autoclave resin is defined by a viscosity versus temperature profile that shows significant, (greater than 30%) reduction in viscosity over the cure cycle temperatures. A specific feature of some preferred out-of-autoclave resins is a two-stage or multi-cycle process capability. Exemplary alternate cure cycles appropriate for some contemplated resin systems comprise curing a part at 180° F. for 14 hours to achieve full strength, or alternately curing a part for 3 hours at 250° F. It is contemplated that in many cases, a cure at 350° F. would allow the part to continue to be cycled at 250° F. In such cases a female tool could be cured partially at 160° F. or 180° F. for 4 hours; then it could be placed back in an oven for a free-standing post cure at a higher temperature of 350° F.

Steps 151 through 157 describe the preferred fabrication of a female tool. In step 151, the male mold is prepared for part creation, and then a chemical release agent is applied to the surface of the male mold. All suitable release agents are contemplated, including Freekote™ 700. In step 152, layers of composite laminate material are placed in the male mold to form the face of the female tool. While all suitable materials are contemplated, mats of carbon fibers that are pre-impregnated with a resin (pre-preg in the industry vernacular) are especially preferred because of convenience. An especially preferred material system is ACG™ L318.

In step 153, the female tool face material is vacuum bagged while still on the male mold. A preferred method for vacuum bagging a layup involves covering the tool face and male mold surface with a substantially impermeable plastic bag, and applying suction via an electric pump. Exposing the female tool face to vacuum reduces the void content and compacts the composite fibers, yielding a stronger and higher quality female tool. Preferred vacuum parameters include a pressure differential of between 12 and 14.6 psi, or between 13 and 14.5 psi coupled with a low leak rate of less than 1 psi per hour or less than 0.1 psi over 5 minutes. In step 154, the vacuum bag is advantageously left on the female tool face and male mold. The combined tools are exposed to a low temperature curing cycle. This low temperature curing cycle exposes the tools to a temperature between 120° F. and 180° F. or between 130° F. and 150° F. for at least 8, 10, 12, 16, 18, 20 or even 22 hours. The resulting female tool face laminate comprising a plurality of layers of composite material is cured in a low temperature process at a primary cure temperature of, for example, 120, 130, 140, 150, 160, or 175 degrees Fahrenheit (° F.), with the female tool laminate on the male mold for a low temp curing time until more than 20%, 30%, or even 40% cross linking has occurred.

In step 155, the tool face is demolded from the male mold, and a backing structure is advantageously bonded to the back side of the female tool face for additional strength and stiffness of the final female tool. Preferred backing structures consist of a lightweight, at least partially composite, egg crate-type structure. In one preferred process, the backer is adhesively floated by a silicon rubber seal, and wet carbon tape is intermittently applied to bond the backer to the back of the female tool face. In step 156, the reinforced female tool is removed from the male mold. Preferred female tools have sufficient strength and stiffness to maintain their geometric configuration in a freestanding fashion.

In step 157, a high temperature post-cure of the female tool is performed in an oven or autoclave. A preferred high temperature cure cycle in an oven involves exposing the female tool to a temperature between 250° F. and 300° F. or between 260° F. and 290° F. for at least 4, 6, 8, or 10 hours. An alternate preferred oven high temperature curing cycle exposes the female tool to a temperature between 380° F. and 410° F. for at least 2, 4, or 6 hours. Autoclave curing cycles are also contemplated. Vacuum can advantageously be applied during post-cure. As used herein, a "high temp post-cure process" is a process that exposes a part or assemblage of parts to temperatures in the range of 300° F., 350° F., or even 400° F. depending on the resin system used. This post-cure step is advantageously performed at a temperature that would destroy the low temperature male mold.

A person skilled in the art will appreciate that despite the shorter lifespan of a lower-weight, lower-cost carbon epoxy tool relative to a machined steel tool, the epoxy tool is still capable of enduring some repetitive exposure to the local pressures of the automated tape laying machines, automated fiber placement machines, and automated stitching machines, and the temperature and pressure cycles of curing ovens and autoclaves. Preferred methods therefore provide for low initial investment manufacturing of large contoured composite laminates of substantially the same quality and stress allowables of production composites as compared with prior art composite production methods. Preferred methods also provide lower labor costs and better traceability and repeatability as compared with prior art composite prototyping methods.

It is contemplated that the recent development of out-of-autoclave resin systems can make the present inventive material even more attractive. Such a resin system could deliver 90% of the structural material properties and void content of traditional autoclave cured laminates, without the time and expense of the autoclave process. Thus, it is contemplated that carbon epoxy tools used in preferred methods would not need to withstand repetitive exposure to autoclave pressures, and are expected to have a relatively long life in production. As a result, a production-ready prototype design could be achieved with a single design path at a low cost and rapid turnaround.

As previously discussed, autoclaves used for curing composite materials can represent a large portion of production cost. In prior art processes, the compaction that an autoclave applies is often crucial for reducing void count in prior art processes, and in consolidating plies both for composite tools and the final composite laminate. A typical autoclave process can apply 100 pounds-per-square-inch (psi) compaction pressure as opposed to up to 15 psi for a vacuum process. Proper consolidation in an airframe or part laminate results in higher material properties and thus lower weight and higher performance in the final structure. Proper consolidation in a composite tool results in a higher quality surface and a more robust tool for longer life.

In some embodiments, a high stress allowable out-of autoclave curing composite material could be used in manufacture of the airframe. It is contemplated that a CNC machine could be used for in-mold trimming and drilling at least one part of the airframe. Such methods are capable of reducing total program cost, time to market, and risk.

To fabricate a composite part for an aircraft, an additional set of steps 170 is followed, using the post-cured high temperature limit female tool created in steps 151-157. In step 171, the female tool surface is sealed and released using suitable combinations of chemical sealants and release agents. The sealing process may also be performed immediately after tool post cure (step 157). Preferred parts may use the same material and resin systems (such as Cytec™ 5320 or ACG™ MTM-45) to serve as high strength, high stiffness aircraft components.

Fabrication of the aircraft part itself follows an at least partially automated process, in step 173. While all suitable processes are contemplated, three such processes are especially preferred. These processes may use composite materials that are the same or different, but in especially preferred embodiments, all use carbon fibers. First is the use of an automated fiber placement machine or tape laying machine to deposit composite material directly onto the female tool, as in step 181.

A second preferred process for part fabrication is a partially automated manual layup. In this partially automated process, an automatic cutting machine and table are used to cut portions of composite laminate, pre-preg, woven fabric, or other layer of structural material as in step 191. The cut portions of composite material are placed in the female tool with the aid of a laser placement tool and pre-determined ply stackups, as in step 193. Preferred methods involve depositing at least six pieces of composite material with the aid of a laser placement machine projecting placement locations on the female tool or composite material. In preferred processes, the material is manually placed with an accuracy of at least 0.01 inches with respect to the desired placement. Some preferred composite parts are large, with a minimum width or height of at least 6, 8, or 10 feet, where the dimension names width and height are chosen so that the height dimension is the smallest. In this manner, some preferred composite parts are sufficiently large that a technician cannot reach the center of the part for finishing operations without scaffolding.

A third preferred process involves the use of an automated stitching machine. Preferred stitching processes and machines are described in "Composite materials for aircraft structures" by Alan Baker, Stuart Dutton, and Donald Kelly from 2004. Stitching processes have traditionally used heavy steel tooling.

Regardless of which at least partially automated part fabrication technique is selected, the composite part and female tool will be subjected to a high temperature curing process to yield a fully cured aircraft part, as in step 177. A preferred high temperature curing cycle in an oven involves exposing the part and female tool to a temperature between 250° F. and 300° F. or between 260° F. and 290° F. for at least 3, 4, 6, 8, 10, or 12 hours. An alternate preferred oven high temperature curing cycle exposes the part and female tool to a temperature between 370° F. or 380° F. and 400° F. or 410° F. for at least 2, 4, 6, or 8 hours. Autoclave curing cycles are also contemplated. In preferred curing cycles, the part is vacuum bagged to the tool during the cure.

In step 178, steps of in-mold trimming and drilling of the aircraft part are performed while the part is still in the female mold or female tool. In especially preferred embodiments, the female tool can serve as a fixture for trimming and drilling of the final part. It is envisioned that once curing and assembly steps have been completed using the female tool, the composite part is removed from the female tool. Then, in step 179, hand touching up of the fuselage or fuselage components may be required to achieve specified dimensional or other tolerances. The term "hand touching up" means that the modifications needed as a result of variability introduced by use of a somewhat soft tool prone to a greater degree of thermal expansion than a steel tool, need human judgment to make the modification, and that such modifications can vary significantly from one fuselage to another. Contemplated modifications may include, for example, one or more of sanding or otherwise mechanically abrading, clamping, deforming, heating, or otherwise fitting one part to another.

FIG. 2A is a perspective illustration of an especially preferred tooling support framework 200 for an aircraft wing skin tool. This tooling support framework is fabricated of steel elements welded together. Exterior members 202, 204, 206, 208 are coupled together and also coupled to interior braces 210, 212, 214. A base board of sheet steel or plywood is advantageously coupled to the top of this support frame. The base board may have width and length dimensions larger than the support frame. Casters, wheels, or other provisions for mobility may be also advantageously coupled to the support frame, useful for large parts.

Figure 2B:
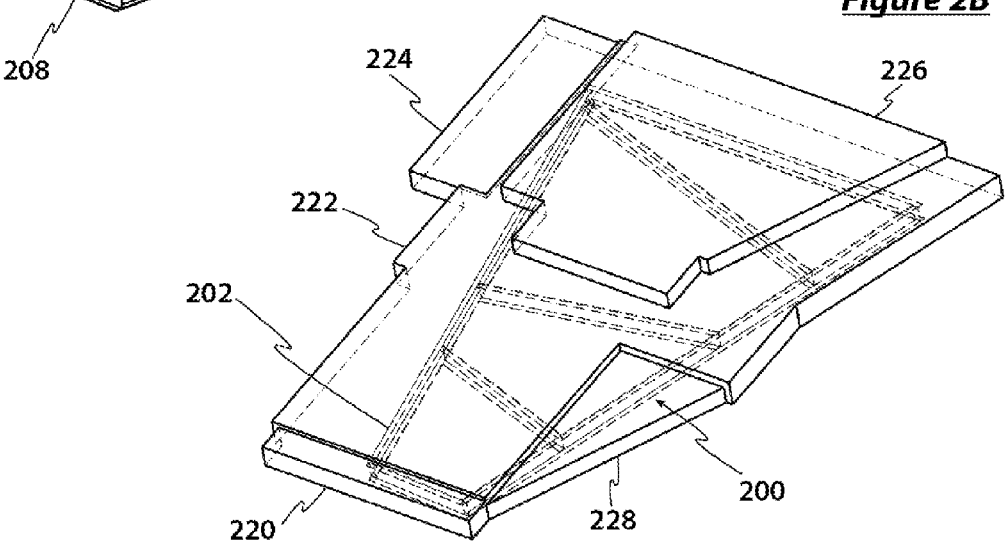
FIG. 2B is a perspective illustration of rough-cut blocks of substrate material coupled to the support framework.

FIG. 2B is a perspective illustration of rough-cut blocks of substrate material coupled to the support framework 200. A plurality of blocks 220, 222, 224, 226, 228 of low temperature limit substrate material are coupled to the support framework. Preferred coupling methods involve bonding the blocks to the base board using a machinable adhesive. All suitable adhesives are considered, including expanding adhesives such as Gorilla Glue™

Figure 3A:
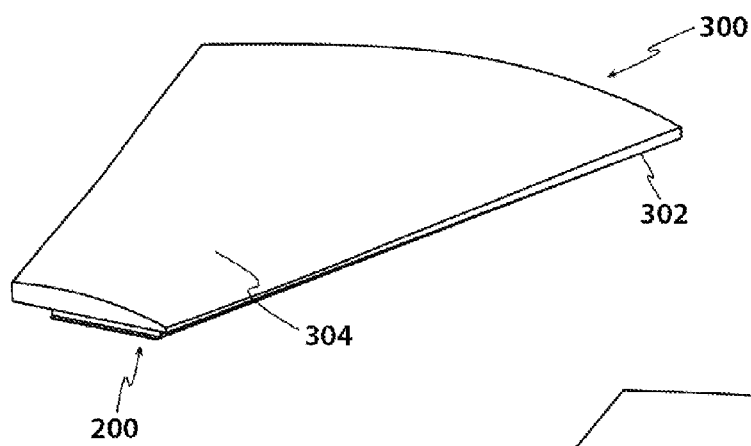
FIG. 3A is a perspective illustration of a step in the preferred construction of a male mold, showing a machined substrate surface.

FIG. 3A is a perspective illustration of a step 300 in the preferred construction of a male mold, showing a machined surface 304 of a substrate material 302. The support framework 200 of FIG. 2A is also visible.

Figure 3B:
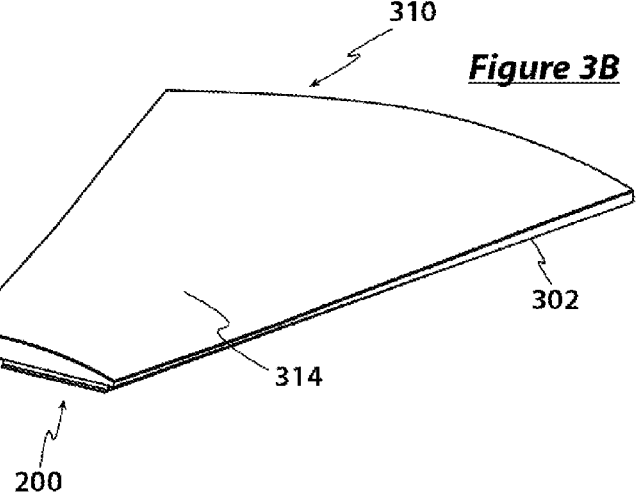
FIG. 3B is a perspective illustration of a subsequent step in the preferred construction of a male mold, after a sheeting layer and surface layer have been applied.
Figure 3C:
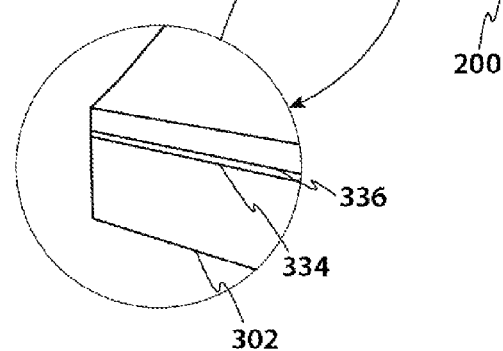
FIG. 3C is a detailed enlargement of a region of FIG. 3B, showing a preferred male mold substrate material, sheeting layer, and surface layer.

FIG. 3B is a perspective illustration of a subsequent step in the preferred construction of a male mold 310, after a sheeting layer 334 and surface layer 336 have been applied. FIG. 3C is a detailed enlargement of a region 330 of FIG. 3B, showing a preferred male mold substrate material 302, sheeting layer 334, and surface layer 336. The surface layer 336 is machined to yield a high quality male mold surface 314 with tight tolerances.

Figure 4A:
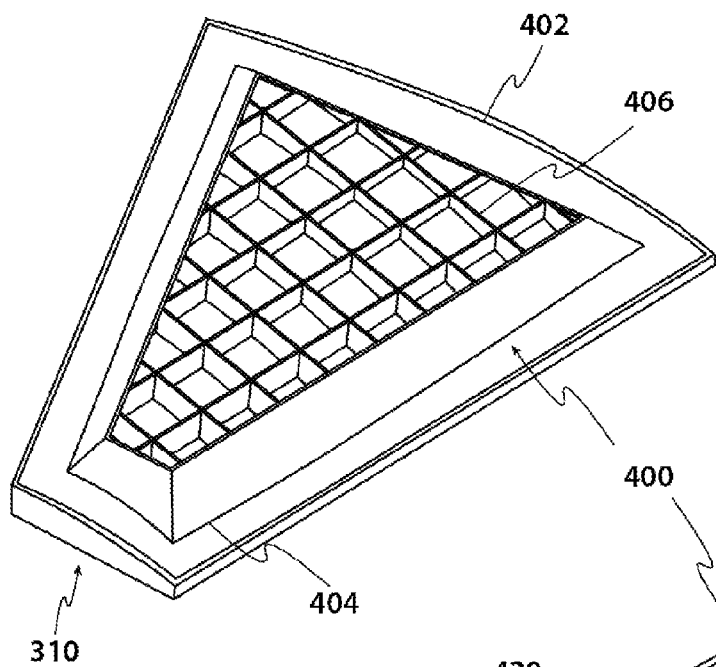
FIG. 4A is a perspective illustration of a female tool being constructed with the aid of the male mold of FIG. 3B.

FIG. 4A is a perspective illustration of a female tool 400 being constructed with the aid of the male mold 310. Composite material is deposited on the male mold 310 to form a female tool face surface 402, which is then cured at a low temperature under the upper limit temperature of the male mold 310. Once the tool face surface 402 is cured, a backer 404 or other backing structure is preferably bonded, mechanically fastened, or otherwise coupled to the tool face surface 402. The female tool 400 can then be removed and separated from the male mold at room temperature (50 to 80 degrees Fahrenheit) without the aid of added heat, and subjected to a high temperature curing cycle to complete its curing. The male mold is advantageously not destroyed in this process, allowing it to be re-used.

Figure 4B:
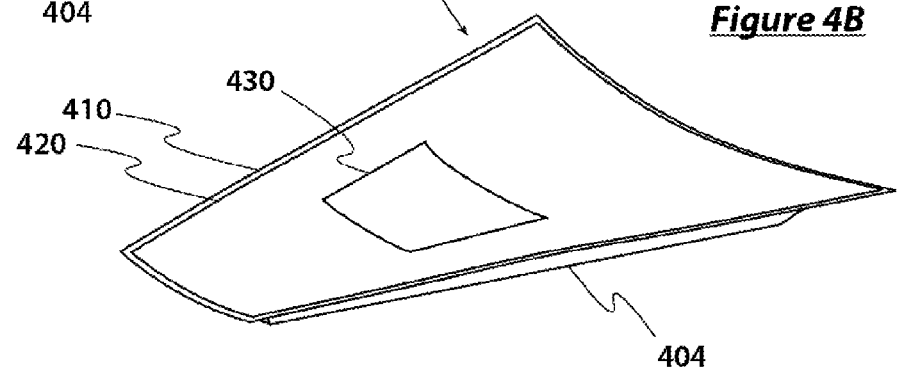
FIG. 4B is a perspective illustration of a composite aircraft part being layed up in the female tool of FIG. 4A with the assistance of a laser placement machine.

FIG. 4B is a perspective illustration of a composite aircraft skin part 420 being layed up in the female tool 400 with the assistance of a laser placement machine (not shown). Pieces of composite material are advantageously cut on an automatic cutting table with aid of specialized CAD and CAM tools that generate cutting patterns. The laser placement machine preferably indicates desired placement of composite material through an indicated light pattern 430, preferably along with other indication information such as ply number or material indications.

Figure 5:
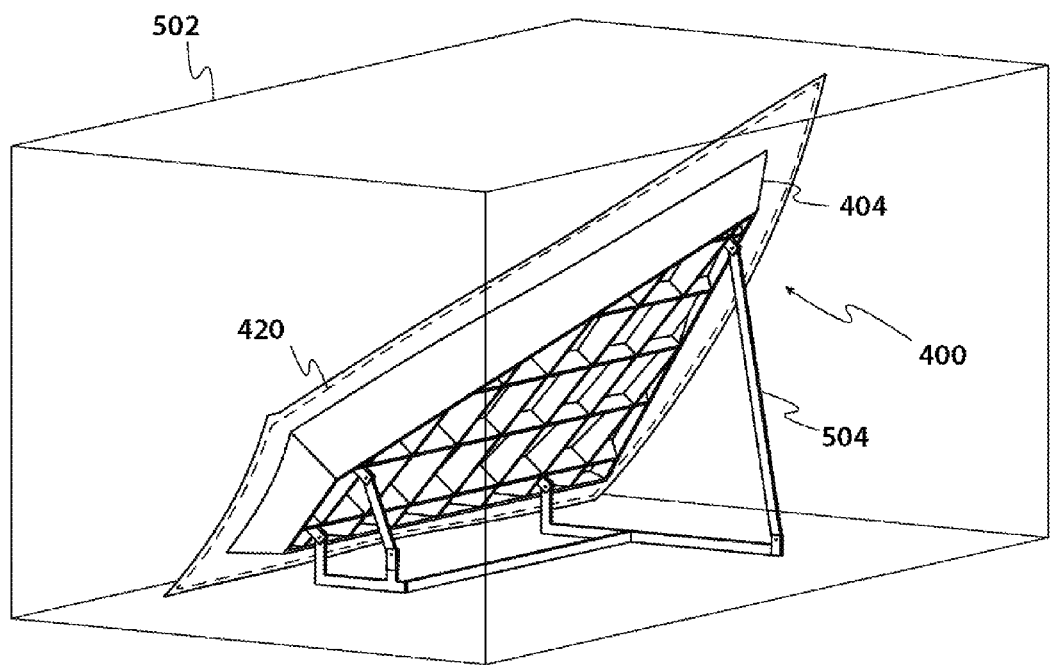
FIG. 5 is a perspective illustration of the composite aircraft part and female tool of FIG. 4B in an oven for a curing cycle.

FIG. 5 is a perspective illustration of a composite aircraft skin part 420 and female tool 400 in an oven 502 for a final curing cycle of the aircraft part 420 before trimming, separation, and finishing. In this figure, the female tool 400 is mounted on a curing support frame 504 that allows the combined tool 400 and part 420 to enter an oven 502 with insufficient size to accommodate the tool 400 and part 420 without orienting them at an oblique angle relative to their orientation during the layup step.

Figure 6:
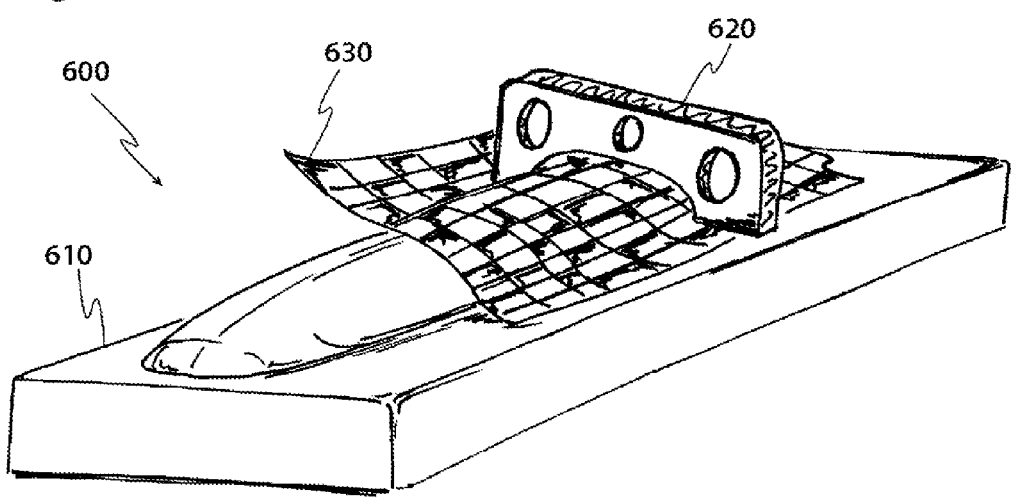
FIG. 6 is a perspective illustration of a step in a preferred manufacturing process, using a male mold to create a female tool.

FIG. 6 depicts a step 600 in a preferred manufacturing process that uses a low temp male mold 610 to create a high temp female tool 710 (not shown in this figure). A material is machined into a low temp male mold 610.

Preferred methods of manufacturing the male mold comprise designing, manufacturing, and utilizing low-cost high-precision master tools with a low upper limit temperature (120-180 degrees Fahrenheit). High precision is preferably achieved using computer numerically controlled or CNC machining to mill or otherwise shape a master tool. Low cost is preferably achieved by the selection of materials having a relatively low upper limit temperature, which are usually less expensive than materials having a relatively high upper limit temperature. Accuracy is achieved using a higher cost, higher density surface material applied in a lower quantity (volume) than the substrate.

Preferred methods further comprise manufacturing and utilizing high temperature limit (270-400 degree Fahrenheit) carbon-epoxy (or fiberglass-epoxy) lamination and assembly tooling made from low temperature masters generated in a previous step using low temp/high temp tooling resins and processes. Exemplary low temp/high temp out-of-autoclave tooling resins and processes are described in "Composite Airframe Structures: Practical Design Information and Data", by Michael C. Y. Niu, Hong Kong Conmilit Press Ltd., 2005.

Especially preferred methods include utilizing high stress allowable out-of autoclave curing composite materials. In some embodiments, large CNC "router" machines can advantageously be used for trimming and drilling composite parts.

All suitable materials are contemplated for the male mold 610 including epoxy board, high density foam, or other material. To make a female tool, a plurality of layers of composite material 630 are layed up on the low temp male mold 610. All suitable composite materials are contemplated, but especially preferred composite materials include carbon fiber fabric weaves pre-impregnated with an epoxy resin. The resulting laminate comprising a plurality of layers of composite material 630 is cured in a low temperature process with the laminate on the tool 610 for a low temp curing time until sufficient cross linking has occurred.

Once the low temperature curing has taken place, a supporting member 620 is bonded with the cured laminate comprising a plurality of layers of composite material 630 to provide supporting structure for the resulting female tool 710.

The resulting female tool 710 is preferably subjected to a free-standing high temp post-cure process. The term "free-standing" is used herein to mean that the female tool is no longer supported by the male mold 610, and is capable of maintaining a geometric configuration without external support.

Figure 7:
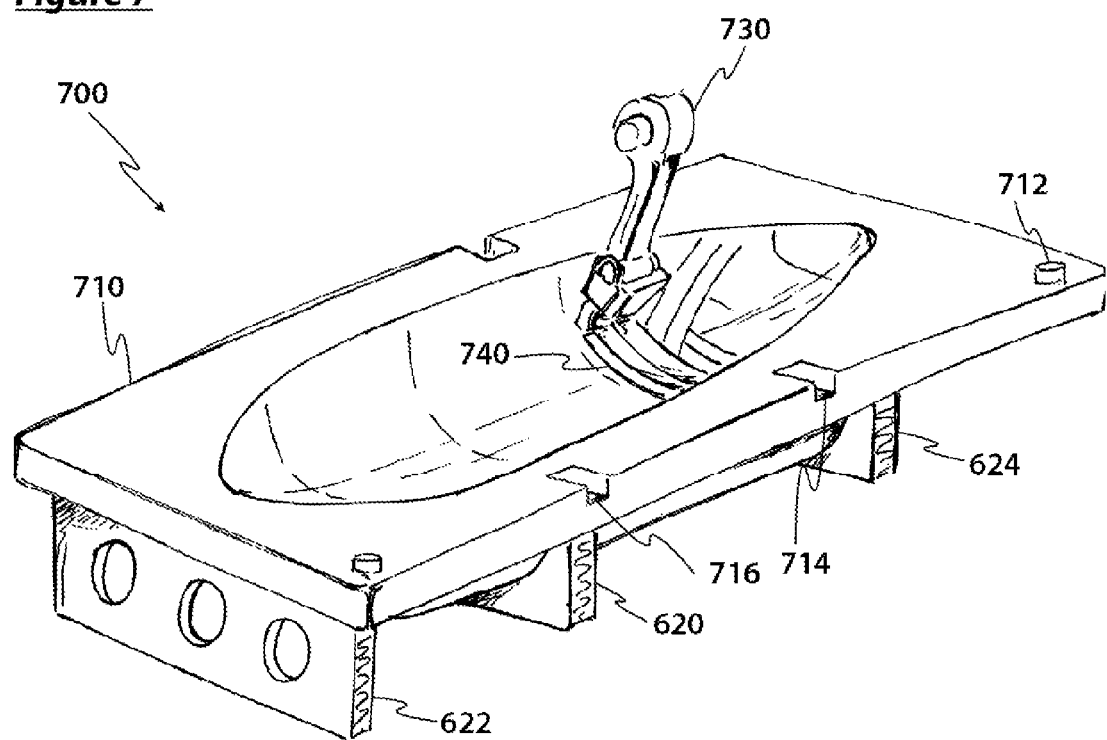
FIG. 7 is a perspective illustration of a subsequent step in the process of FIG. 6 in which an automated layup machine is used to deposit composite material.

FIG. 7 depicts a second step 700 in a preferred manufacturing process in which an automated layup machine 730 is used to deposit or lay down composite material 740. All suitable automated layup machines 730 are contemplated, but automated fiber placement machines and automated tape laying machines are especially preferred. Similarly, all suitable composite materials 740 are contemplated, but especially preferred composite materials are those comprising graphite or carbon.

A preferred female tool 710 has a tooling indicator 712, and a first and second assembly fixtures 714, 716. Further, the tool 710 is supported by supporting members 620, 622, 624. The tooling indicator 712 and assembly fixture 714 enable the tool 710 to be used for trimming, drilling, and assembly.

FIG. 8 illustrates a third step 800 in the same preferred manufacturing process in which an airframe is assembled in the female tool 710. An automated layup machine 730 advantageously deposits composite material 740 to create a skin laminate 812. It is contemplated that stringers 814, 816, and cutout reinforcements 818 may also be created by said automated layup machine 730, or bonded to the skin laminate 812 in a manual process.

A first fuselage frame 820 supported by a frame support 830 installed in assembly fixture 714. A second fuselage frame 822 could be subsequently installed. Fuselage frames are preferably attached to the skin laminate 812 by bonding or using fasteners.

In preferred methods, an assembled airframe is subjected to a final curing process in one or more female tools 710. In alternate methods, the skin laminate 812 and stringers 814, 816 may be co-cured in the female tool 710 before bonding fuselage frames 820, 822 in place. Preferred final curing processes comprise vacuum or autoclave pressures, and curing temperatures of 250° F. or 350° F.

Thus, specific embodiments and applications of automated prototyping of a composite airframe have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of producing a composite part of an aircraft, comprising in sequence:
    manufacturing a low-temp male mold from a material selected from the group consisting of a soft plastic and a foam, the material permanently deforming at or below an upper limit temperature that is no greater than 180° F., using computer numerically controlled machining;
    adding a plurality of composite layers to the male mold to create a female tool and at least partially curing the female tool at a primary cure temperature below the upper limit temperature, while at least a portion of the female tool is coupled to at least a portion of the male mold;
    separating at least the portion of the female tool from the portion of the male mold;
    curing the female tool at a secondary cure temperature above the upper limit temperature;
    depositing a first composite material on the female tool, in a freestanding fashion, to create the composite part; and
    hand touching up the composite part to meet a specification.

2. The method of claim 1, wherein the step of producing the composite part comprises at least one of in-mold automated trimming and drilling of the composite part subsequent to a cure of the composite part.

3. The method of claim 1, wherein the step of producing a composite part comprises performing a hand touch-up of the part subsequent to a cure of the composite part.

4. The method of claim 1, wherein the upper limit temperature is no greater than 160° F.

5. The method of claim 1, wherein the primary cure temperature is at least 140° F.

6. The method of claim 1, wherein the secondary cure temperature is at least 250° F.

7. The method of claim 1, wherein the secondary cure temperature is at least 350° F.

8. The method of claim 1, wherein the step of depositing a first composite material on the female tool comprises use of a fiber placement machine.

9. The method of claim 1, wherein the step of hand touching up comprises mechanically abrading.

10. The method of claim 1, wherein the first composite material comprises at least one of carbon-epoxy and fiber-glass-epoxy.

11. The method of claim 1, further comprising a step of using the female tool as a fixture for drilling the composite part.

12. The method of claim 1, further comprising a step of reusing the master tool to create a second female tool.

* * * * *